J. S. LYNCH.
CUTTING MECHANISM FOR MOWERS.
APPLICATION FILED JAN. 11, 1908.
957,468.
Patented May 10, 1910
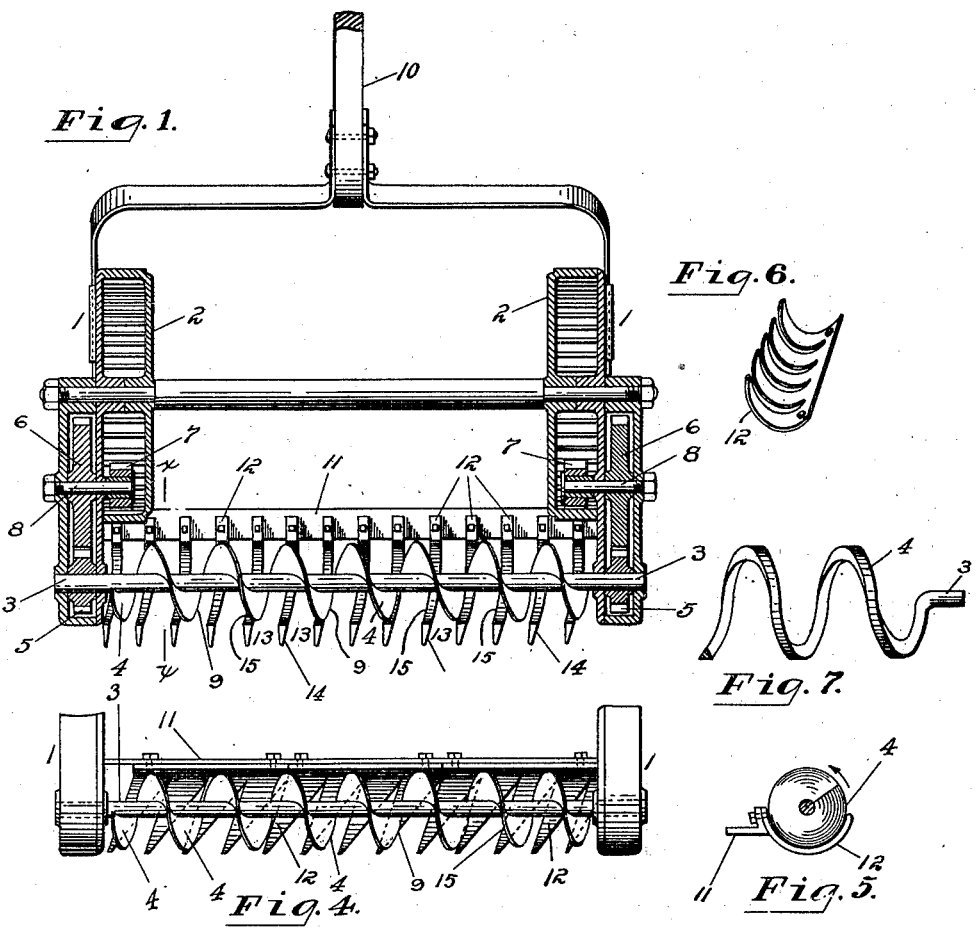
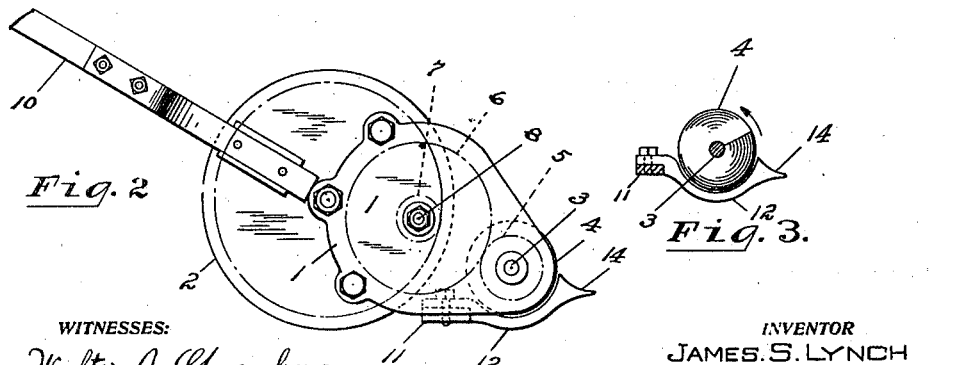
WITNESSES:
Walter A. Greenburg
A. M. Dow.
INVENTOR
JAMES. S. LYNCH
BY
ATTORNEYS

UNITED STATES PATENT OFFICE.

JAMES S. LYNCH, OF CITRONELLE, ALABAMA.

CUTTING MECHANISM FOR MOWERS.

957,468.   Specification of Letters Patent.   Patented May 10, 1910.

Application filed January 11, 1908. Serial No. 410,315.

*To all whom it may concern:*

Be it known that I, JAMES S. LYNCH, a citizen of the United States of America, residing at Citronelle, in the county of Mobile and State of Alabama, have invented certain new and useful Improvements in Cutting Mechanism for Mowers, of which the following is a specification, reference being had therein to the accompanying drawings.

This invention relates to a new cutting apparatus for mowers and the object of the invention is to provide cutting mechanism in which the knife operates with a shearing action.

To this end my invention embodies a revolving knife having a knife edge which forms a plurality of spiral convolutions and a series of stationary knife guards having knife edges adapted to coöperate therewith all in the manner more fully hereinafter described.

In the drawings which accompany this specification, Figure 1 is a plan view partly in horizontal section showing my invention as embodied in a lawn mower. Fig. 2 is a side elevation thereof. Fig. 3 is a cross section on line $x$—$x$ of Fig. 1. Fig. 4 is a plan view of a modified construction of cutting mechanism. Fig. 5 is a cross section of Fig. 4. Fig. 6 is a detached perspective view of a section of the stationary knife guards shown in Fig. 4 and Fig. 7 is a detached perspective view of a modified form of revolving knife.

Referring to the reference numerals on the drawings 1 is the frame, 2 the internally geared ground wheels and 10 the handle of the lawn mower all of known construction except as more fully hereinafter described. In the front end of the frame is journaled a transverse shaft 3 which carries the revolving knife 4 and this shaft receives motion from the ground wheels through suitable intermediate gear in a manner to cause the knife to rapidly revolve in the direction of the arrows shown in Figs. 3 and 5, which is in a direction opposite to that in which it revolves in the ordinary lawn mower.

As illustrated in the drawings, the transverse shaft 3 carries pinions 5 at the ends which receive motion through intermediate gear wheels 6 from pinions 7 connected therewith through stub shafts 8 and meshing with the internal gear of the ground wheels.

The revolving knife 4 is formed similar to a conveyer screw preferably as a continuous spiral blade with a plurality of convolutions, the spiral edge of the blade forming the cutting edge 9 thereof. This knife revolves within a concave which as shown in Fig. 1 is composed of a series of individual knife guards 12 secured to a transverse bar 11. These knife guards project forwardly at an angle obliquely to the line of the travel of the mower and form open interstices 13 between them for the entrance of the grass and their front ends are preferably provided with forwardly and downwardly extending fingers 14 for guiding the grass into the interstices.

Each knife guard is formed with a cutting edge 15 which is adapted to coöperate with a portion of the cutting edge of the revolving knife once at each revolution of the same. To this end the cutting edges 15 conform substantially at least for a portion of their length to the knife edge of the revolving knife and preferably a sufficient number of knife guards are provided to cause each part of the cutting edge of the revolving knife to coöperate with one of the knife guards. It will be seen that by this arrangement the revolving knife operating as a conveyer will feed the grass entering between the knife guards against the cutting edges thereof and then the coöperating portions of the cutting edge of the revolving knife will once at each revolution coincide therewith and sever the grass by a shearing cut in the forward direction of the travel of the mower.

On account of the shape of the knife guards one edge thereof, the one which is opposed to the incoming grass may be properly called the anterior edge and the one which is not opposed thereto and which forms the cutting edge may be called the posterior edge, thus the cutting takes place against the posterior edge of the knife guards.

It is not necessary that the cutting edges 15 of the stationary knife guards should exactly conform to the spiral cutting edge of the revolving knife, neither is it necessary that they should be of spiral shape to be within the scope of my invention. Thus while in Fig. 1 the effective forward positions of the cutting edges 15 conform approximately to the shape of the spiral cutting edge of the revolving knife they are parts of spirals of a lesser pitch, the advantage resulting from this arrangement would be that the cutting action between each knife guard and the revolving knife would not take place at once along the whole edge of the knife guard, but gradually beginning at the base of the knife guard.

In Fig. 4 I show the knife guards formed as integral parts of a concave or of sections of a concave and the edges of these knife guards are wholly formed in vertical planes conforming approximately only to the shape of the knife guards in Fig. 1, many other obvious modifications of the knife guards may be made within the spirit of my invention.

The revolving knife may also be variously modified as any of the different designs of screw-conveyers may be readily adapted for the purpose, or the knife may be formed of a twisted bar as shown in Fig. 7 this would dispense with the use of a shaft by forming the bearings integrally with the knife.

What I claim as my invention is:—

1. In cutting mechanism, the combination with a rotary knife having a spiral cutting edge, of a plurality of fixed knife guards extending forwardly on the underside of said knife and partially encircling the same obliquely in a direction substantially corresponding to that of the tangents to the spiral cutting edge at the points of co-action thereof with said knife guards.

2. In cutting mechanism, the combination with a rotary knife having a spiral cutting edge, of a plurality of fixed knife guards extending forwardly on the underside of said knife and partially encircling the same obliquely in a direction substantially corresponding to that of the tangents to the spiral cutting edge at the points of co-action thereof with said knife guards, one edge of each knife guard forming a cutting edge for said knife adapted to coöperate with a portion of its cutting edge.

3. In cutting mechanism, the combination with a rotary knife having a spiral cutting edge, of a plurality of fixed knife guards extending forwardly on the underside of said knife and partially encircling the same obliquely in a direction substantially corresponding to that of the tangents to the spiral cutting edge at the points of co-action with said knife guards, one edge of each knife guard forming a cutting edge with which a portion of the cutting edge of the knife is adapted to coöperate, the cutting edges of said knife guards collectively forming a cutting edge corresponding to that of the spiral cutting edge.

In testimony whereof I affix my signature in presence of two witnesses.

JAMES S. LYNCH.

Witnesses:
R. ROY MOYERS,
R. L. PRINE.